US012281495B2

(12) United States Patent
Caterino et al.

(10) Patent No.: US 12,281,495 B2
(45) Date of Patent: Apr. 22, 2025

(54) GEARBOX CLUTCH MECHANISM FOR MOTORIZED LOCK

(71) Applicant: Master Lock Company LLC, Oak Creek, WI (US)

(72) Inventors: Mark Caterino, Prospect, CT (US); Wai P. Wong, Orange, CT (US)

(73) Assignee: Master Lock Company LLC, Oak Creek, WI (US)

(*) Notice: Subject to any disclaimer, the term of this patent is extended or adjusted under 35 U.S.C. 154(b) by 133 days.

(21) Appl. No.: 18/204,192

(22) Filed: May 31, 2023

(65) Prior Publication Data

US 2024/0035307 A1 Feb. 1, 2024

Related U.S. Application Data

(60) Provisional application No. 63/394,216, filed on Aug. 1, 2022.

(51) Int. Cl.
*E05B 47/00* (2006.01)

(52) U.S. Cl.
CPC .. *E05B 47/0012* (2013.01); *E05B 2047/0028* (2013.01)

(58) Field of Classification Search
CPC ......... E05B 47/0012; E05B 2047/0013; E05B 2047/0026; E05B 2047/0027; E05B 2047/0028
USPC ........................................................ 70/278.7
See application file for complete search history.

(56) References Cited

U.S. PATENT DOCUMENTS

| | | | | |
|---|---|---|---|---|
| 11,193,303 B2* | 12/2021 | Morstatt | E05B 3/02 |
| 11,313,665 B2* | 4/2022 | Caterino | G01B 7/30 |
| 2016/0171808 A1* | 6/2016 | Caterino | H04N 7/186 340/5.61 |
| 2018/0320413 A1* | 11/2018 | Wong | E05B 47/02 |
| 2019/0226827 A1* | 7/2019 | Caterino | E05B 47/026 |
| 2019/0383061 A1* | 12/2019 | Shen | E05B 47/02 |
| 2021/0174620 A1* | 6/2021 | Kusanale | E05B 47/0012 |

* cited by examiner

*Primary Examiner* — Nathan Cumar
(74) *Attorney, Agent, or Firm* — Foley & Lardner LLP

(57) ABSTRACT

A clutch for a door lock may comprise an output shaft configured to operate the door lock, and a thumb turn shaft coupled to the output shaft comprising an inclined projection. The clutch may also comprise an input gear configured to be coupled to an actuator output, and a coupler coupled to the input gear such that the coupler and input gear rotate together. The coupler may be configured to translate between an engaged position and a disengaged position, where the inclined projection of the thumb turn shaft is configured to move the coupler from the disengaged position to the engaged position when the thumb turn shaft rotates relative to the coupler. In the disengaged position the coupler may be decoupled from the output shaft.

20 Claims, 11 Drawing Sheets

GEARBOX CLUTCH MECHANISM FOR MOTORIZED LOCK

CROSS-REFERENCE TO RELATED APPLICATIONS

This application claims the benefit under 35 U.S.C. § 119(e) to U.S. Provisional Application Ser. No. 63/394,216, titled "GEARBOX CLUTCH MECHANISM FOR MOTORIZED LOCK," filed Aug. 1, 2022, which is herein incorporated by reference in its entirety.

FIELD

Disclosed embodiments are related to gearbox clutch mechanisms for motorized locks and related methods of use.

BACKGROUND

Door locks (e.g., deadbolt locks) may be used to secure doors to prevent unauthorized entry. Some door locks can be operated manually by a knob, thumb-turn, or other handle mounted on a secured side of the door, and by a key on an unsecured side of the door. For such door locks, rotation of the handle extends or retracts a deadbolt or latch into or out of the door. Some door locks may be electromechanically actuatable in addition to being manually actuatable. Such electromechanical door locks may include a motor that may extend or retract the bolt or latch.

SUMMARY

In some embodiments, a clutch for a door lock comprises an output shaft configured to operate the door lock, where the output shaft rotates about a longitudinal axis, a thumb turn shaft coupled to the output shaft, where the thumb turn shaft comprises an inclined projection, an input gear operatively couplable to the output shaft, the input gear configured to be coupled to an actuator output, and a coupler coupled to the input gear such that the coupler and the input gear rotate together about the longitudinal axis. The coupler is configured to translate along the longitudinal axis between an engaged position and a disengaged position. In the engaged position the coupler is coupled to the output shaft. In the disengaged position the coupler is decoupled from the output shaft. The inclined projection of the thumb turn shaft is configured to move the coupler from the engaged position to the disengaged position when the thumb turn shaft rotates relative to the coupler.

In some embodiments, a method of operating a door lock comprises applying external torque to an input gear with an actuator, where the external torque applied to the input gear is transmitted to an output shaft via a coupler coupled to the input gear when the coupler is in an engaged position. The method also comprises stopping the input gear with the actuator, applying external torque to a thumb turn shaft coupled to the output shaft, where the external torque applied to the thumb turn shaft is transmitted to the output shaft while the input gear is stopped, and translating the coupler from the engaged position to a disengaged position with an inclined projection of the thumb turn shaft in response to torque application to the thumb turn shaft, where in the disengaged position the coupler is decoupled from the output shaft.

In some embodiments, a clutch for a door lock comprises an output shaft configured to operate the door lock, where the output shaft rotates about a longitudinal axis, an input gear configured to be coupled to an actuator output, where the input gear comprises an inclined wedge, and a clutch disk configured to translate along the longitudinal axis between an engaged position and a disengaged position. In the engaged position the clutch disk is engaged with the output shaft such that the clutch disk transmits torque between the input gear and the output shaft. In the disengaged position the clutch disk is decoupled from the output shaft such that the input gear is decoupled from the output shaft. The inclined wedge of the input gear is configured to engage the clutch disk to move the clutch disk from the disengaged position to the engaged position when the input gear rotates relative to the clutch disk.

In some embodiments, a method of operating a door lock comprises applying external torque to an output shaft with a handle, where the external torque is applied to the output shaft while a clutch disk is in a disengaged position and is decoupled from the output shaft. The method also comprises applying external torque to an input gear with an actuator to rotate the input gear relative to the clutch disk, where rotating the input gear relative to the clutch disk engages an inclined wedge of the input gear with the clutch disk to translate the clutch disk from the disengaged position to an engaged position, and where in the engaged position the clutch disk is coupled to the output shaft. The method also comprises transmitting torque from the input gear to the output shaft via the clutch disk in the engaged position.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

BRIEF DESCRIPTION OF DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings.

DETAILED DESCRIPTION

Figure 1:
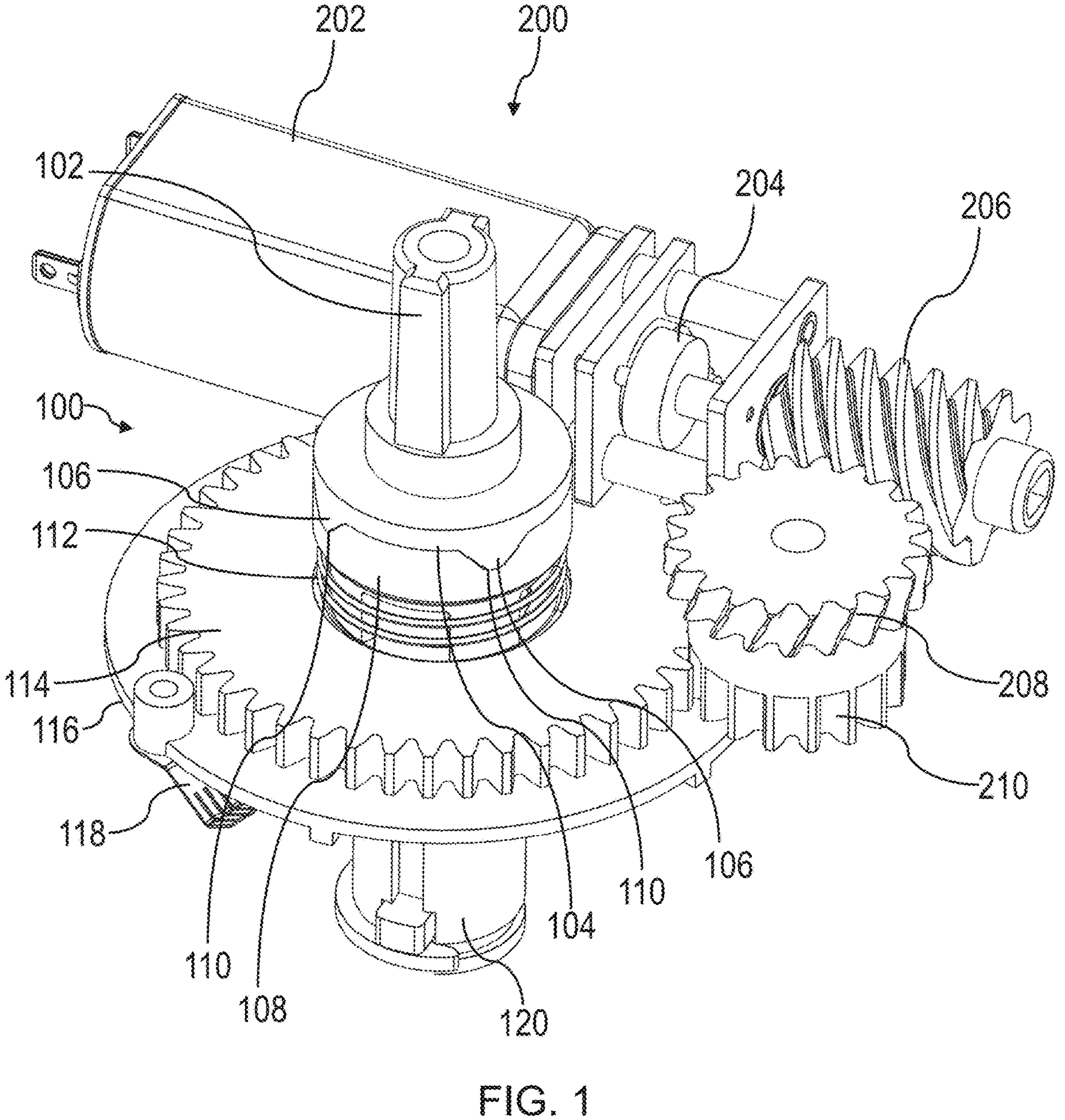
FIG. 1 is a perspective view of an embodiment of a clutch and an actuator for a door lock.

Traditionally, doors often employ door locks (e.g., deadbolt locks) including a bolt or latch that in a retracted (e.g., unlocked) position is disposed at least partially within a door and in an extended (e.g., locked) position extends out from the door, such as into a door jamb of a door frame. The physical presence of the bolt or latch extending from within the door into the door jamb inhibits the door from being opened by blocking the door from being swung out of the door frame. Such door lock may include actuators (e.g., motors) to move a bolt or latch of the lock between the extended position and/or the retracted position.

In some cases, door locks may employ one or more rotating shafts that rotate as part of driving the extension or retraction of the bolt or latch of the door lock, when manually operated or when operated by the actuator. As the rotating shaft rotates, the bolt or latch is driven along its linear path of travel between the retracted position and/or the extended position. The rotating shaft may be operatively coupled to the actuator and the actuator may be configured to apply force to the driveshaft in two rotational directions to either extend or retract the bolt or latch. In some cases, a handle (e.g., a thumb turn) is also coupled to the driveshaft and is configured to allow for manual movement of the bolt or latch between the extended and retracted positions.

The inventors recognized that, if both the actuator and the handle (e.g., a thumb turn) of a door lock are coupled to the rotating shaft, operation of the handle may apply a force to the actuator and/or the actuator may resist movement of the handle. The inventors therefore recognized the benefits of a clutch to decouple an actuator or a handle from a rotating shaft, such that, for example, when the handle is operated, the actuator may be decoupled from the driveshaft. Such decoupling may allow different actuator arrangements to be employed in a compact door lock, including those that may not be backdrivable. In some such actuating arrangements, input of external torque at a manual handle may be excessive to overcome the large back-drive resistance from the actuator arrangement where is clutch is not employed to decouple the actuator from the manual handle. For example, when a worm gear is used with an actuator assembly, a clutching mechanism may be desirable to separate the worm gear from the manually operable handle to allow for reliable and easy manual movement of a door lock in two directions to correspondingly extend or retract a latch or a bolt.

The inventors also recognized, however, that there are disadvantages to existing clutches. Conventionally available clutches could be integrated into a door lock for such a purpose and selectively decouple an actuator from a rotating shaft, but such conventionally available clutches would allow powered rotation in only a single rotational direction. This means the actuator would not be able to drive the bolt or latch in an extending/lock direction and in a retracting/unlocking direction. This would be disadvantageous for a door lock with an actuator, as it would limit the utility of the lock.

In addition to the above, some conventional door locks allow for approximately 90 degrees of rotation of a manual handle in either the forward or backward direction. This arrangement may be suitable for certain door locks that are operated with such a limited rotation. However, the inventors have appreciated that other door lock arrangements in various regions (e.g., in Europe) may require 1800 degrees of rotation (e.g., five full turns) to extend or retract a latch or bolt of a door lock. Accordingly, the inventors have appreciated the desirability of a clutch configured for such applications that accommodates numerous rotations under input of manual external torque or actuator external torque.

In view of the above, the inventors have recognized the benefits of a clutch for a door lock that selectively decouples an actuator from an output shaft of the door lock. In particular, the inventors have recognized the benefits of a clutch that employs translational movement of a clutch component based on either input of manual external torque at a handle or on input of actuator external torque by an actuator of a door lock. When the actuator is decoupled from an output shaft by the clutch, a handle of the door lock may rotate the output shaft or gear without significant resistance from the actuator and related components (e.g., gearbox). The clutch may also have a small form factor relative to conventional clutches, as the clutch may fit into a form factor similar to the size of an input gear alone.

In some embodiments, a clutch for a door lock may allow an actuator (e.g., a DC motor, stepper motor, brushless motor, etc.) to remain engaged to an output shaft of a door lock in a default state. The actuator may apply torque to the output shaft while the actuator is coupled to the output shaft via the clutch. The clutch may be configured such that when external torque is applied manually to a handle (e.g., a thumb turn), the clutch may decouple the actuator from the output shaft. In some embodiments, application of the external torque to the handle may be resisted by the actuator, and this resistance may cause the clutch to decouple the actuator from the output shaft. In some embodiments, a portion of the clutch may be moved (e.g., translated along a longitudinal axis of the output shaft) from an engaged position to a disengaged position due to the resistance of the actuator. The clutch may ensure that manual input of external force is always able to operate the door lock, regardless of the state of the actuator. Additionally, because the clutch ensures that the actuator is coupled to the output shaft by default, the output shaft may respond quickly to torque application by the actuator without first needing to align with and engage the output shaft. Such an arrangement may further allow strong torque transmission from the actuator to the output shaft without significant efficiency loss.

In some embodiments, a clutch for a door lock includes an output shaft configured to operate the door lock and a thumb turn shaft coupled to the output shaft. The output shaft may be coupled to a latch or a bolt of the door lock, and rotation of the output shaft may move the latch or bolt to an extended or retracted position. For example, rotation of the output shaft in a first direction may move the latch or bolt to an extended position, and rotation of the output shaft in second direction opposite the first direction may move the latch or bolt to a retracted position. The thumb turn shaft may be configured to receive external manually applied torque by a user to a handle such as a thumb turn. The thumb turn shaft and output shaft may be coupled in all states of the clutch. In some embodiments, the thumb turn shaft and output shaft may be a single component (e.g., integrally formed). The clutch may also include an input gear configured to be coupled to an actuator output. For example, the input gear may be coupled to the actuator via a transmission which may reduce or otherwise alter the output of the actuator. The input gear may be configured to receive torque generated by the actuator and transmit that torque to the output shaft. The clutch may also include a coupler coupled to the input gear such that the coupler and input gear rotate together. The coupler may be configured to translate along the output shaft between an engaged position and a disengaged position to selectively decouple the input gear from the output shaft. Rotation of the thumb turn shaft relative to the coupler may cause the coupler to move from the engaged position to the disengaged position to decouple the input gear from the output shaft. The coupler may function to transmit torque from the input gear to the output shaft while the coupler is in the engaged position. The coupler may be biased toward the engaged position such that the input gear is coupled to the output shaft by default.

In some embodiments, a method of operating a door lock including a clutch may include applying external torque to an input gear with an actuator. The external torque may be transmitted to an output shaft of the clutch via a coupler that is coupled to the input gear when the coupler is in an engaged position. By default, the coupler may be in the engaged position. In some embodiments, the coupler may be biased toward the engaged position. The method may also include stopping the input gear with the actuator. For example, power may be stopped to the actuator and the actuator may stop via friction. In other embodiments, active force (e.g., braking force) may be applied to the actuator and/or by the actuator to stop the input gear. The method may also include applying external torque to a thumb turn shaft. The external torque applied to the thumb turn shaft may be transmitted to the output shaft while the actuator and input gear remains stopped. In some embodiments, the input shaft may be held in a stopped state by friction of the actuator or an associated gear train. For example, in some embodiments a worm gear associated with the actuator may be engaged with the input gear and the worm gear may resist rotation in one direction. The method may include translating the coupler from the engaged position to a disengaged position with the thumb turn shaft in response to the torque application to the thumb turn shaft. In the disengaged position the coupler may be decoupled from the output shaft which may correspondingly decouple the input gear from the output shaft. Accordingly, the output shaft may rotate relative to the input gear with the coupler in the disengaged position, As used herein "external torque" refers to torque received from a source outside of the clutch. For example, torque transmission internal to the clutch components may not be "external torque" whereas torque applied by a user (e.g., at a handle) or torque applied by an actuator (e.g., a motor) may be "external torque" relative to the clutch itself. However, the use of "external" does not describe the physical position of components relative to a door lock. For example, an actuator of a door lock may be disposed within a housing and may apply an external torque to an input gear. As another example, a handle (e.g., a thumb turn) may be partially disposed within a housing and may be used by a user to apply an external torque to a thumb turn shaft.

In some embodiments, a clutch for a door lock may decouple an actuator from an output shaft of a door lock in a default state. The actuator may apply torque to the clutch to couple the actuator with the output shaft to allow torque transmission from the actuator to the output shaft. The clutch may be configured such that when external torque is not being actively applied to an input gear from an actuator, the clutch decouples the actuator from the output shaft. The output shaft may be manually operable by a user without interference from the actuator, as the actuator only couples to the output shaft when in use. Accordingly, the clutch may ensure that manual input of external force is always able to operate the door lock, regardless of the state of the actuator. Additionally, because the clutch ensures that the actuator is decoupled from the output shaft by default, the manual operation of the lock may be smoother and use less force compared to a clutch with the actuator engaged by default.

In some embodiments, clutch for a door lock includes an output shaft configured to operate the door lock. The output shaft may be coupled to a latch or a bolt of the door lock, and rotation of the output shaft may move the latch or bolt to an extended or retracted position. For example, rotation of the output shaft in a first direction may move the latch or bolt to an extended position, and rotation of the output shaft in second direction opposite the first direction may move the latch or bolt to a retracted position. The clutch may also include an input gear configured to be coupled to an actuator output. The clutch may also include a clutch disk configured to translate along the output shaft between an engaged position and a disengaged position. The input gear may include a wedge configured to move the clutch disk from the disengaged position to the engaged position. The input gear may rotate relative to the clutch disk to move the clutch disk from the disengaged position to the engaged position. The clutch disk may be in the disengaged position by default, and in some embodiments may be biased toward the disengaged position.

In some embodiments, a method of operating a door lock including a clutch may include applying external torque to an output shaft. The torque applied to the output shaft may be initially received at a handle and/or thumb turn shaft and may be transmitted (e.g., directly) to the output shaft. A clutch disk of the clutch may be in a disengaged position as the torque is applied to the thumb turn shaft. The method may include applying external torque to an input gear with an actuator to rotate the input gear relative to the clutch disk. Rotating the input gear relative to the clutch disk may cause an inclined wedge of the input gear to engage the clutch disk. The resulting normal force between the inclined wedge and the clutch disk may move the clutch disk to the engaged position from the disengaged position as the input gear rotates relative to the clutch disk. Once in the engaged position, torque may be transmissible between the input gear and the clutch disk such that the input gear does not rotate relative to the clutch disk in one direction. The method may include transmitting torque from the input gear to the output shaft via the clutch disk in the engaged position.

According to exemplary embodiments described herein, a door lock may add electromechanical drive capabilities for an associated deadbolt or latch. That is, the door lock may be retrofittable to existing lock sets so consumers who desire remote or automatic actuation capabilities could add such capabilities without extensive modification of their existing doors. Clutches according to exemplary embodiments described herein may be employed in such retrofit door locks, in some embodiments.

Turning to the figures, specific non-limiting embodiments are described in further detail. It should be understood that the various systems, components, features, and methods described relative to these embodiments may be used either individually and/or in any desired combination as the disclosure is not limited to only the specific embodiments described herein.

FIG. 1 is a perspective view of an embodiment of a clutch 100 and an actuator assembly 200 for a door lock. As shown in FIG. 1, the clutch 100 is engaged with the actuator 202 and controls the transmission of torque from the actuator assembly 200 to a door lock such that the actuator assembly 200 is operable to lock and unlock the door lock (e.g., move a latch or bolt between an extended position and a retracted position) and a user may also manually lock and unlock the door lock. As shown in FIG. 1, the clutch 100 includes a thumb turn shaft 102, a coupler 108, an input gear 114, and an output shaft 120. The thumb turn shaft 102 may be coupled to a handle such as a thumb turn that allows a user to input external torque. The thumb turn shaft 102 may also be coupled to the output shaft 120 and may transmit torque directly to the output shaft 120. The torque transmission between the thumb turn shaft 102 and the output shaft 120 is discussed further with reference to the exemplary embodiments of FIGS. 4-8. The input gear 114 is coupled to the actuator assembly 200 and is configured to receive torque from the actuator assembly 200. The input gear 114 is configured to be selectively coupled to the output shaft 120 to transmit the torque from the actuator assembly 200 to the output shaft 120. In particular, as discussed further below, the coupler 108 is configured to move between an engaged position and a disengaged position to selectively couple the input gear 114 to the output shaft 120. In the engaged position (shown in FIG. 1), the coupler 108 is configured to transmit torque from the input gear 114 to the output shaft 120 and from the output shaft 120 to the input gear 114. In the disengaged position, the coupler 108 is configured to decouple the input gear 114 from the output shaft 120 such that torque is not transmitted between the output shaft 120 and the input gear 114. Accordingly, the actuator assembly 200 is isolated from the output shaft 120 with the coupler 108 in the disengaged position.

Figure 2:
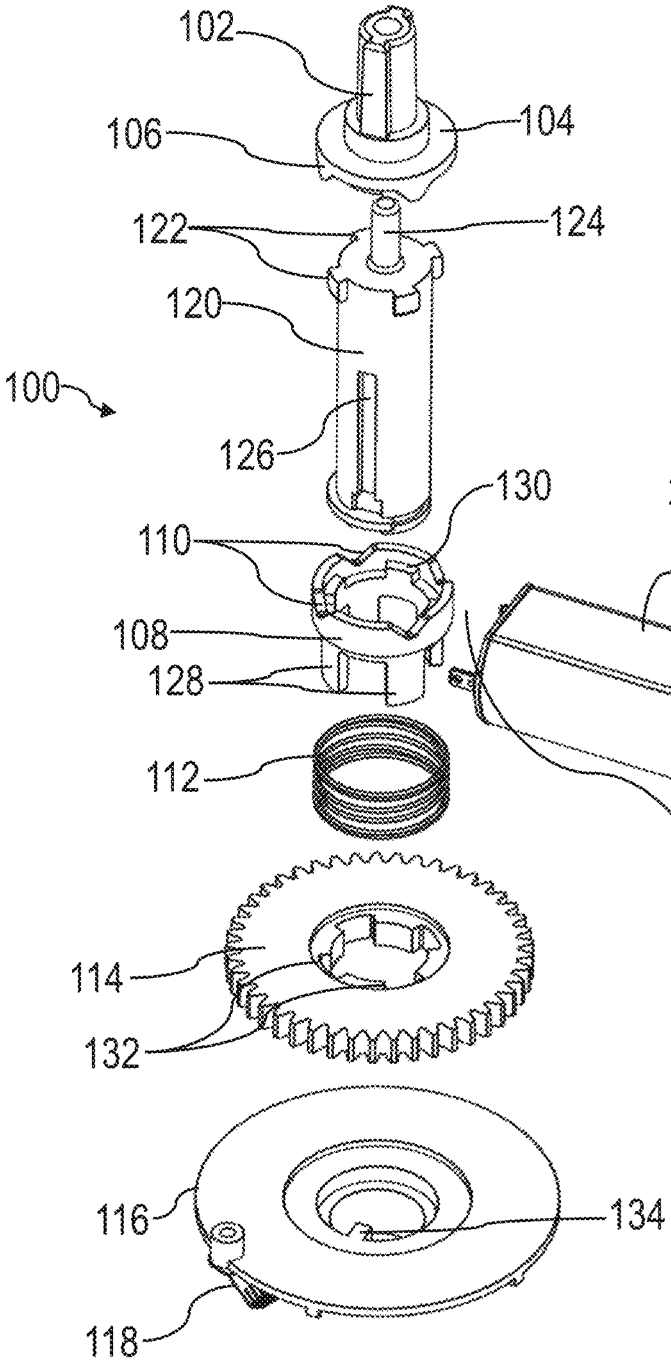
FIG. 2 is an exploded view of the clutch and actuator of FIG. 1.

According to the embodiment of FIG. 2, the actuator assembly 200 includes an actuator 202 (e.g., a motor), a gearbox 204, a worm gear 206, a worm transmission gear 208 and a spur transmission gear 210. The actuator 202 may be a DC motor, stepper motor, servo, or another appropriate motor or actuator. The gearbox 204 may receive torque from the actuator 202 and apply an appropriate gear reduction. The torque may be transmitted from the gearbox 204 to the worm gear 206. The worm transmission gear 208 and the spur transmission gear 210 may be integrally formed in some embodiments or may be otherwise attached to one another. The worm transmission gear 208 may receive torque from the worm gear 206 and transmit that torque through the spur transmission gear 210 to the input gear 114. In the embodiment of FIG. 1, the input gear 114 may be constantly coupled to the actuator assembly 200 via the spur transmission gear 210 regardless of the state of the clutch 100. The use of the worm gear 206 may allow the actuator assembly 200 to be positioned transverse (e.g., perpendicular) to the output shaft 120, which may allow for more compact packaging in a door lock housing. However, the worm gear 206 may resist back-driving (e.g., receiving torque from the input gear 114) which may be the case during manual operation. Accordingly, the clutch 100 is configured to decouple the actuator assembly 200 from the output shaft 120 such that the resistance from the worm gear 206 and/or other portions of the actuator assembly 200 does not substantially interfere with the manual rotation of the output shaft 120 via the thumb turn shaft 102.

According to the embodiment of FIG. 1, the thumb turn shaft 102 includes a flange 104. The flange 104 provides an engagement surface between the thumb turn shaft 102 and the coupler 108. The thumb turn shaft 102 also includes a plurality of inclined projections 106. In the embodiment of FIG. 1, the inclined projections 106 extend from the flange 104 in a direction toward the coupler 108. The inclined projections 106 include inclined walls configured to engage the coupler 108 as the thumb turn shaft 102 rotates relative to the coupler 108 (e.g., when the coupler 108 is held stationary via resistance from the actuator assembly 200 via the input gear 114). In particular, the inclined projections 106 are configured to generate normal forces with the coupler 108 to move the coupler 108 from an engaged position to a disengaged position. The inclined projections 106 move the coupler 108 away from the thumb turn shaft 102 to move the coupler 108 to the disengaged position. As shown in FIG. 1, the coupler 108 includes a plurality of receptacles 110 configured to receive the inclined projections 106. The receptacles 110 have a shape commensurate to a shape of the inclined projections 106. In some embodiments as shown in FIG. 1, the projections and receptacles are triangular. In some embodiments as shown in FIG. 1, the receptacles 110 include inclined walls that extend parallel to corresponding inclined walls of the projections 106. Such an arrangement may make generating the appropriate normal forces to move the coupler 108 to the disengaged position more consistent and reduce static friction between the thumb turn shaft 102 and the coupler 108. As shown in FIG. 1, the clutch includes a spring 112 (e.g., a compression spring) configured to bias the coupler 108 to the engaged position. The spring 112 is disposed between the input gear 114 and the coupler 108 to bias the coupler away from the input gear 114 into engagement with the thumb turn shaft 102. The spring 112 may hold the coupler 108 in contact with the thumb turn shaft 102 whether the coupler 108 is in the disengaged position or engaged position. Operation of the coupler 108 will be discussed further with reference to FIGS. 3-8.

As shown in FIG. 1, the clutch 100 may include a shield 116 disposed between the input gear 114 and an end of the output shaft 120. In some embodiments, the shield may be configured to rotate with the output shaft. For example, the shield 116 and the output shaft 120 may be keyed such that the shield 116 rotates with the output shaft 120. In other embodiments the shield may be omitted or decoupled from the output shaft, as the present disclosure is not so limited. In some embodiments as shown in FIG. 1, the shield 116 may include a rotary potentiometer 118 that may be used with an associated controller to determine the rotational orientation of the output shaft 120. In other embodiments, other sensors may be employed as a part of a clutch, including potentiometers, rotary encoders, or other suitable sensors for providing information regarding the clutch 100.

FIG. 2 is an exploded view of the clutch 100 and actuator assembly 200 of FIG. 1 showing additional details of the clutch 100. As shown in FIG. 2, the thumb turn shaft 102 is separate from the output shaft 120. The thumb turn shaft 102 including the flange 104 and projections 106 may be integrally formed, in some embodiments. In some embodiments the thumb turn shaft 102 may include four inclined projections 106. In other embodiments, other numbers of projections may be employed, including but not limited to two, three, five, and six projections, as the present disclosure is not so limited. As shown in FIG. 2, the output shaft 120 includes a plurality of output shaft keys 122 arranged symmetrically about the output shaft 120. The output shaft 120 also includes a pin 124 that may support the thumb turn shaft 102. As discussed further herein, the thumb turn shaft 102 includes thumb turn keys that engage the output shaft 120 to allow torque transmission between the output shaft 120 and the thumb turn shaft 102 (for example, see FIG. 6). As shown in FIG. 2, the output shaft of FIG. 2 includes a slot 126 which is configured to engage a shield key 134 of the shield 116 so that the shield 116 and the output shaft 120 rotate together. In other embodiments, the shield 116 may be omitted or may not rotate with the output shaft 120, as the present disclosure is not so limited.

As shown in FIG. 2, the coupler 108 includes a plurality of receptacles 110. In the embodiment of FIG. 2, the coupler 108 includes four receptacles 110 that are spaced evenly about a longitudinal axis of the output shaft 120. In other embodiments, other numbers of receptacles may be employed, including but not limited to two, three, five, and six receptacles, as the present disclosure is not so limited. The four receptacles 110 have equal spacing to the projections 106 of the thumb turn shaft 102. Accordingly, the projections 106 may seat in the receptacles 110 every 90-degree rotation of the thumb turn shaft 102 relative to the coupler 108. In the arrangement of FIG. 2, the projections 106 and the receptacles 110 are equally angularly spaced about the longitudinal axis of the output shaft 120 (e.g., one every 90-degrees for a total of four receptacles 110 and four projections 106). The coupler 108 also includes a plurality of coupler keys 130 configured to engage the output shaft keys 122 of the output shaft 120. The coupler keys 130 may selectively engage the output shaft keys 122 based on the position of the coupler 108. For example, in the engaged position the coupler keys 130 may engage the output shaft keys 122 to allow torque transmission between the coupler 108 and the output shaft 120. In the disengaged position, the coupler keys 130 may clear the output shaft keys 122 such that there is no torque transmission between the coupler 108 and the output shaft 120. The coupler 108 also includes a plurality of tabs 128 that extend in a direction toward the input gear 114. The tabs 128 are engaged by slots 132 of the input gear 114. The tabs are configured to couple the coupler 108 to the input gear 114 such that the coupler 108 and the input gear 114 rotate together about the longitudinal axis of the output shaft 120. However, the coupler 108 remains able to translate along the longitudinal axis (e.g., translate linearly) relative to the input gear 114 between the engaged and disengaged positions. The coupler is able to translate relative to the input gear 114, such that the input gear 114 may remain at the same longitudinal location along the output shaft 120 as the coupler 108 moves between the engaged and disengaged positions.

It should be noted that while specific couplings and mechanical relationships are described with reference to some embodiments herein, including the embodiment of FIG. 2, the present disclosure is not limited by the specific implementations described. For example, receptacles and projections may be inverted such that they are on different components than as described (e.g., the coupler may include projections and the thumb turn shaft may include receptacles). Likewise, any suitable torque transmission couplings (e.g., keys, slots, etc.) between various components may be employed in any suitable number (e.g., numbers other than four), as the present disclosure is not so limited.

Figure 3:
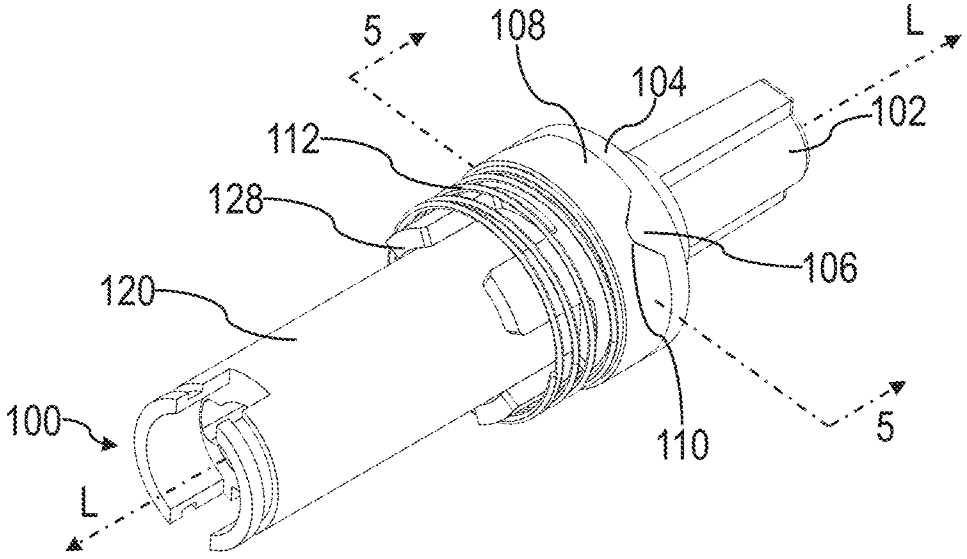
FIG. 3 is a perspective view of a portion of the clutch of FIG. 1 in a first state.

FIG. 3 is a perspective view of a portion of the clutch 100 of FIG. 1 in a first state. As shown in FIG. 3, the output shaft 120, coupler 108, thumb turn shaft 102, and spring 112 are isolated from other components for the sake of explanation. As shown in FIG. 3, the output shaft 120 is configured to rotate about a longitudinal axis L. Rotation of the output shaft 120 about the longitudinal axis L is configured to extend or retract a bolt or latch of an associated door lock. In the state of FIG. 3, the coupler 108 is in the engaged position. The coupler 108 is configured to translate along the longitudinal axis L of the output shaft 120 between the engaged position shown in FIG. 3 and the disengaged position shown in FIG. 4. Accordingly, the receptacles 110 of the coupler have received the projections 106 of the thumb turn shaft 102 such that the coupler 108 is seated with the thumb turn shaft 102. In the engaged position, the coupler 108 is coupled to the output shaft 120 via coupler keys (see FIG. 2) such that torque may be transmitted between the coupler 108 and the output shaft 120. The spring 112 biases the coupler 108 toward the engaged position shown in FIG. 3. Accordingly, the spring 112 forces the coupler 108 against the flange 104 of the thumb turn shaft 102 and maintains the coupler 108 in constant engagement with the thumb turn shaft 102. In particular, the spring 112 maintains the coupler 108 in constant engagement with the projections 106. As shown in FIG. 3, the coupler 108 includes tabs 128 configured to couple the coupler 108 to an input gear (see FIG. 2) for torque transmission while allowing the coupler 108 to move linearly along the longitudinal axis L between the engaged position and the disengaged position.

Figure 4:
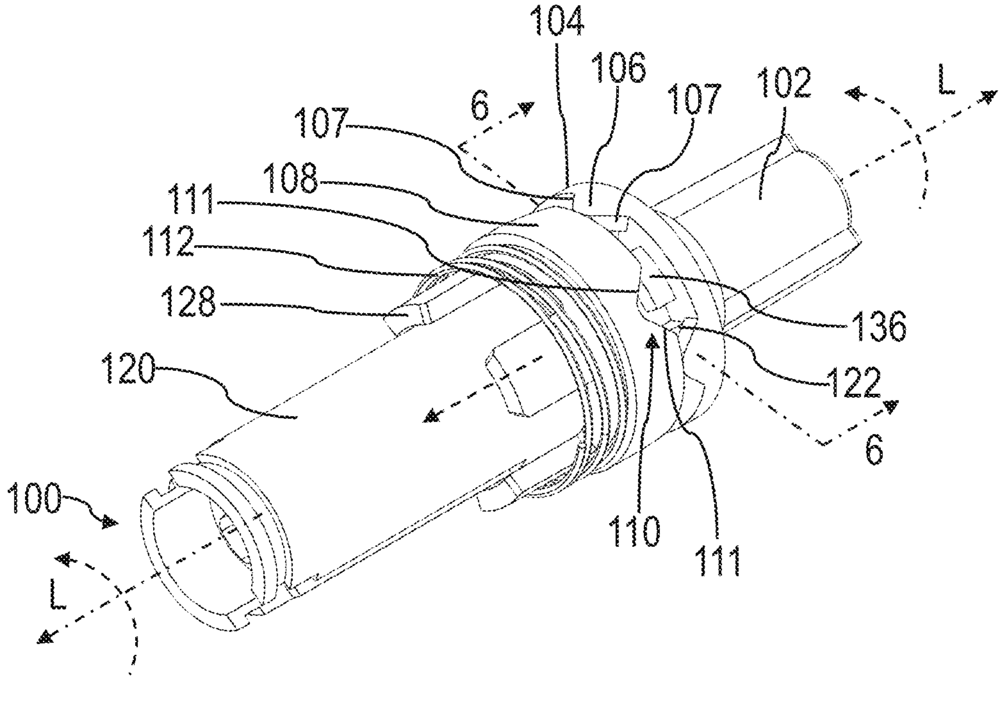
FIG. 4 is a perspective view of the portion of the clutch of FIG. 3 in a second state.

FIG. 4 is a perspective view of the portion of the clutch 100 of FIG. 3 in a second state. As shown in FIG. 4, the coupler 108 is in the disengaged position and is not seated with the thumb turn shaft 102. As shown by the curved dashed arrows in FIG. 4, the thumb turn shaft 102 and the output shaft 120 are rotated about the longitudinal axis L. The rotation of the thumb turn shaft 102 may be in response to external torque applied to the thumb turn shaft 102 by a user (e.g., via a handle). As torque is applied to the thumb turn shaft 102, the coupler 108 may be held stationary by the tabs 128 that are coupled to an input gear. The input gear may be coupled to an actuator assembly, which may hold the input gear stationary (e.g., via active braking, passive friction forces, or any combination thereof). In some embodiments, a worm gear resistant to back-drive may hold the input gear stationary. Accordingly, the coupler 108 resists the torque applied by the thumb turn shaft to the coupler 108 via the projections 106. As force is applied by the thumb turn shaft 102 to the coupler 108, normal forces generated by inclined walls 111 of the receptacles 110 and inclined walls 107 of the projections 106 force the coupler 108 away from the thumb turn shaft 102 shown by the dashed arrow, as the rotation of the coupler 108 is constrained due to the coupling to the input gear. When the thumb turn shaft 102 rotates relative to the coupler 108 in a first direction, a first inclined receptacle wall 111 and a first inclined projection wall 107 may engage one another as camming surfaces to move the coupler 108 to the disengaged position. When the thumb turn shaft 102 rotates relative to the coupler 108 in second direction opposite the first direction, a second inclined receptacle wall 111 and a second inclined projection wall 107 may engage one another as camming surfaces to move the coupler to the disengaged position. The coupler 108 therefore rides up on the inclined walls 107 of the projections 106 as the thumb turn shaft 102 rotates relative to the coupler 108 to move to the disengaged position. As the spring 112 continues to bias the coupler 108 into engagement with the thumb turn shaft 102, the coupler 108 is held in the disengaged position by the ends of the projections 106. As the thumb turn shaft 102 continues to rotate about the longitudinal axis L, the coupler 108 will re-seat with the thumb turn shaft 102 approximately every 90 degrees when the projections 106 align with the receptacles 110. Accordingly, the coupler 108 will briefly move to the engaged position before being translated again to the disengaged position as the thumb turn shaft 102 continues to rotate under application of torque by a user. Accordingly, the clutch 100 of the embodiment of FIG. 4 may generate a number of "clicks" as the thumb turn shaft 102 rotates relative to the coupler 108 as the coupler 108 is reseated with the thumb turn shaft 102 and then translates to the disengaged position again.

As shown in FIG. 4, the thumb turn shaft 102 includes a plurality of thumb turn shaft keys 136. The output shaft 120 includes a plurality of output shaft keys 122. The thumb turn shaft keys 136 engage the output shaft keys 122 of the output shaft 120 to transmit torque between the thumb turn shaft 102 and the output shaft 120. When the coupler 108 is in the disengaged position shown in FIG. 4, the coupler 108 clears the output shaft keys 122 of the output shaft 120 such that torque is not transmitted between the output shaft 120 and the coupler 108. In the engaged position shown in FIG. 3, the coupler 108 engages the output shaft keys 122 of the output shaft 120 to allow torque transmission between the output shaft 120 and the coupler 108.

Figure 5:
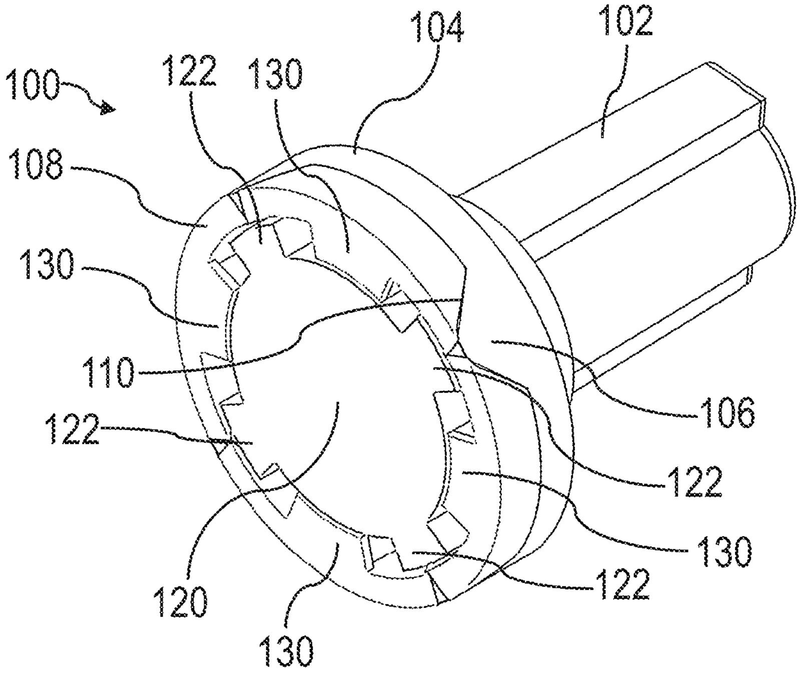
FIG. 5 is a cross-sectional view of the portion of FIG. 3 taken along line 5-5.

FIG. 5 is a cross-sectional view of the clutch 100 of FIG. 3 taken along line 5-5. The cross-section of FIG. 5 depicts the coupler 108 in an engaged position. As shown in FIG. 4, the output shaft 120 includes a plurality of output shaft keys 122. In the specific embodiment of FIG. 5, the output shaft 120 includes four output shaft keys 122. The four keys provide a torque coupling for the thumb turn shaft 102 and the coupler 108 when the coupler is in the engaged position. The coupler 108 includes a plurality of coupler keys 130 that are disposed in a rotational path of the output shaft keys 122 of the output shaft 120, such that the output shaft 120 is not able to rotate substantially relative to the coupler 108 without the coupler keys 130 engaging the output shaft keys 122 of the output shaft 120. In the embodiment of FIG. 5, the coupler 108 includes four coupler keys 130. In other embodiments, any suitable number of coupler keys 130 and output shaft keys 122 of the output shaft 120 may be employed, as the present disclosure is not so limited. As shown in FIG. 5, the coupler 108 is seated with the thumb turn shaft 102 and the projections 106 are received in the receptacles 110.

Figure 6:
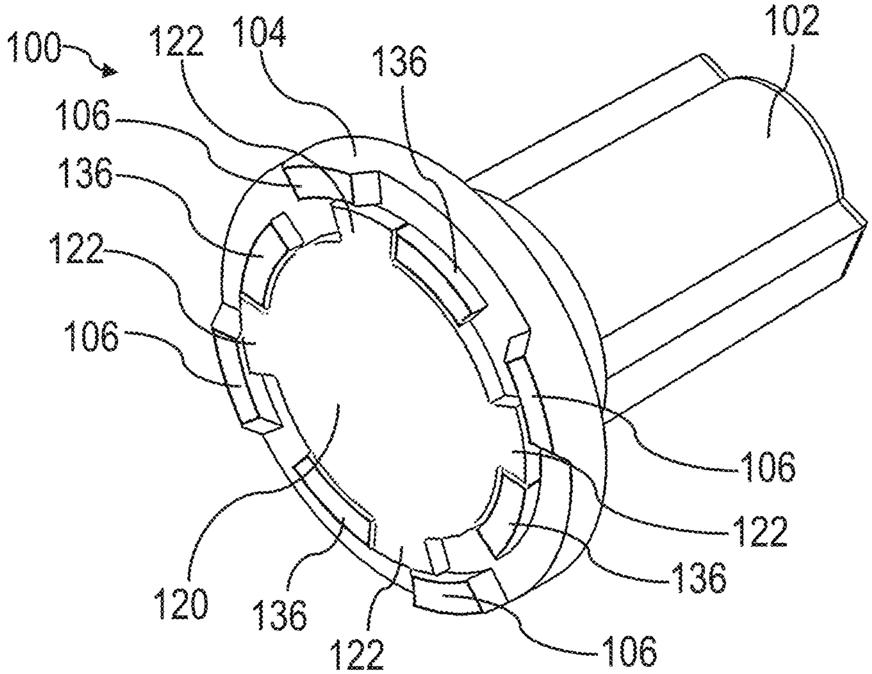
FIG. 6 is a cross-sectional view of the portion of FIG. 4 taken along line 6-6.

FIG. 6 is a cross-sectional view of the clutch 100 of FIG. 3 taken along line 6-6. The cross-section of FIG. 6 is depicted with the coupler in a disengaged position, and accordingly the coupler is not shown. As discussed with reference to FIG. 5, the output shaft 120 includes a plurality of output shaft keys 122. The thumb turn shaft 102 includes a plurality of thumb turn keys 136 that are configured to engage the output shaft keys 122 of the output shaft 120. The thumb turn keys 136 are disposed in a rotational path of the output shaft keys 122, such that the thumb turn shaft 102 is not able to substantially rotate relative to the output shaft 120 without the thumb turn keys 136 engaging the output shaft keys 122. In the embodiment of FIG. 6, the thumb turn shaft 102 includes four thumb turn keys 136. In other embodiments, any suitable number of thumb turn keys 136 and output shaft keys 122 of the output shaft 120 may be employed, as the present disclosure is not so limited.

Figure 7:
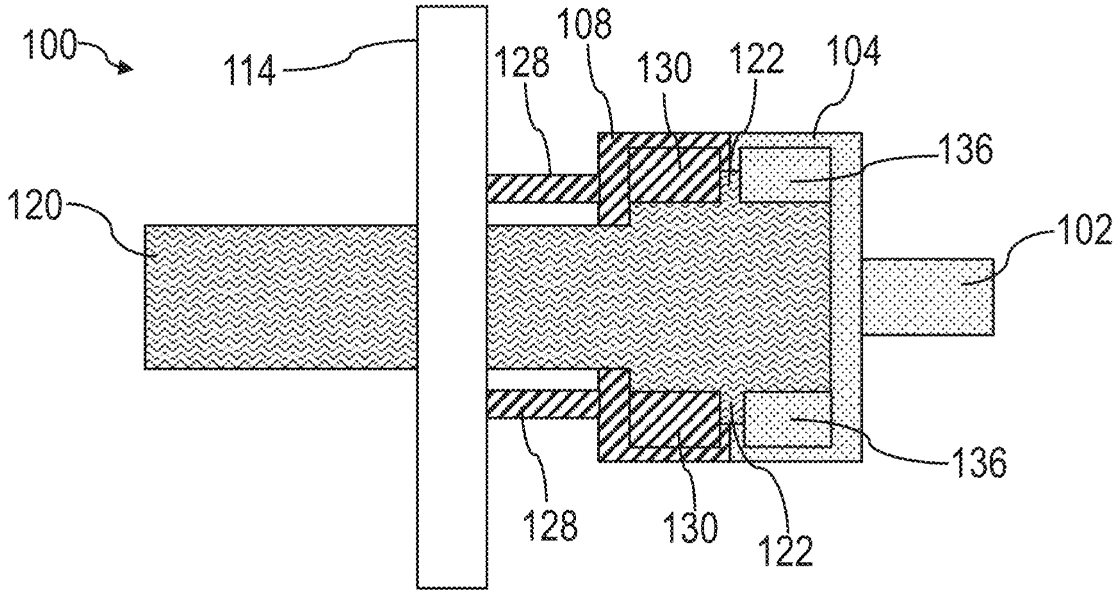
FIG. 7 is a side schematic of a portion of a clutch according to some embodiments in a first state.
Figure 8:
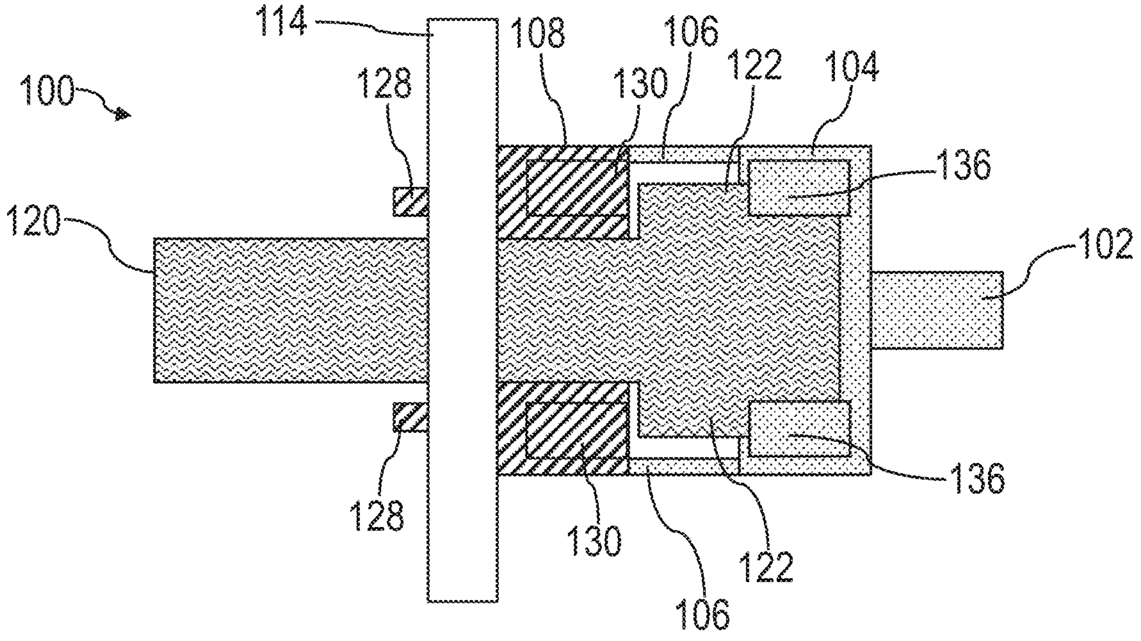
FIG. 8 is a side schematic of the portion of the clutch of FIG. 7 in a second state.

FIG. 7 is a side schematic of a portion of a clutch 100 according to some embodiments in a first state and FIG. 8 shows the clutch 100 in a second state. The schematics of FIGS. 7-8 illustrate the selective torque engagement between a coupler 108 and an output shaft 120. As shown in FIGS. 7-8, the clutch includes an output shaft 120, a thumb turn shaft 102, a coupler 108, and an input gear 114. The coupler 108 is coupled to the input gear 114 via tabs 128. The tabs 128 rotationally couple the coupler 108 and the input gear 114, but allow the coupler 108 to translate along the output shaft 120 relative to the output shaft 120. This translation allows the coupler 108 to move between an engaged and disengaged position to selectively couple to the output shaft 120.

In the state shown in FIG. 7, the coupler 108 is in the engaged position and is coupled to the output shaft 120 to allow torque transmission therebetween. The coupler includes coupler keys 130 that overlap with output shaft keys 122 of the output shaft 120. The coupler keys 130 engage the output shaft keys 122 to transmit torque between the coupler 108 and the output shaft 120. As shown in FIG. 7, the thumb turn shaft 102 includes thumb turn keys 136 that also overlap with the output shaft keys 122 of the output shaft 120. Torque is therefore able to be transmitted between the thumb turn shaft 102 and the output shaft 120. Accordingly, in the state of FIG. 7 the thumb turn shaft 102, output shaft 120, coupler 108, and input gear 114 may rotate together. Torque applied by an actuator through the input gear 114 may be employed to rotate the output shaft 120 in the state shown in FIG. 7. The thumb turn shaft 102 may also rotate commensurately with the output shaft 120.

In the state shown in FIG. 8, the coupler 108 is in the disengaged position and is decoupled from the output shaft 120. As shown in FIG. 8, the coupler 108 has translated along the output shaft in a direction away from the thumb turn shaft 102. The coupler 108 is moved to the disengaged position by projections 106 of the thumb turn shaft 102, as discussed in reference to exemplary FIGS. 5-6. The tabs 128 maintain the coupler 108 coupled to the input gear 114 and protrude past the input gear 114 as the coupler 108 has moved closer to the input gear 114. The coupler keys 130 no longer overlap with the output shaft keys 122 of the output shaft 120. Accordingly, the output shaft 120 is free to rotate relative to the coupler 108. Accordingly, external torque from a user (e.g., from manual operation) may be applied to the thumb turn shaft 102 (e.g., via a handle) to rotate the output shaft 120 without interference from the coupler 108 and input gear 114 when the coupler 108 is in the disengaged position.

Figure 9:
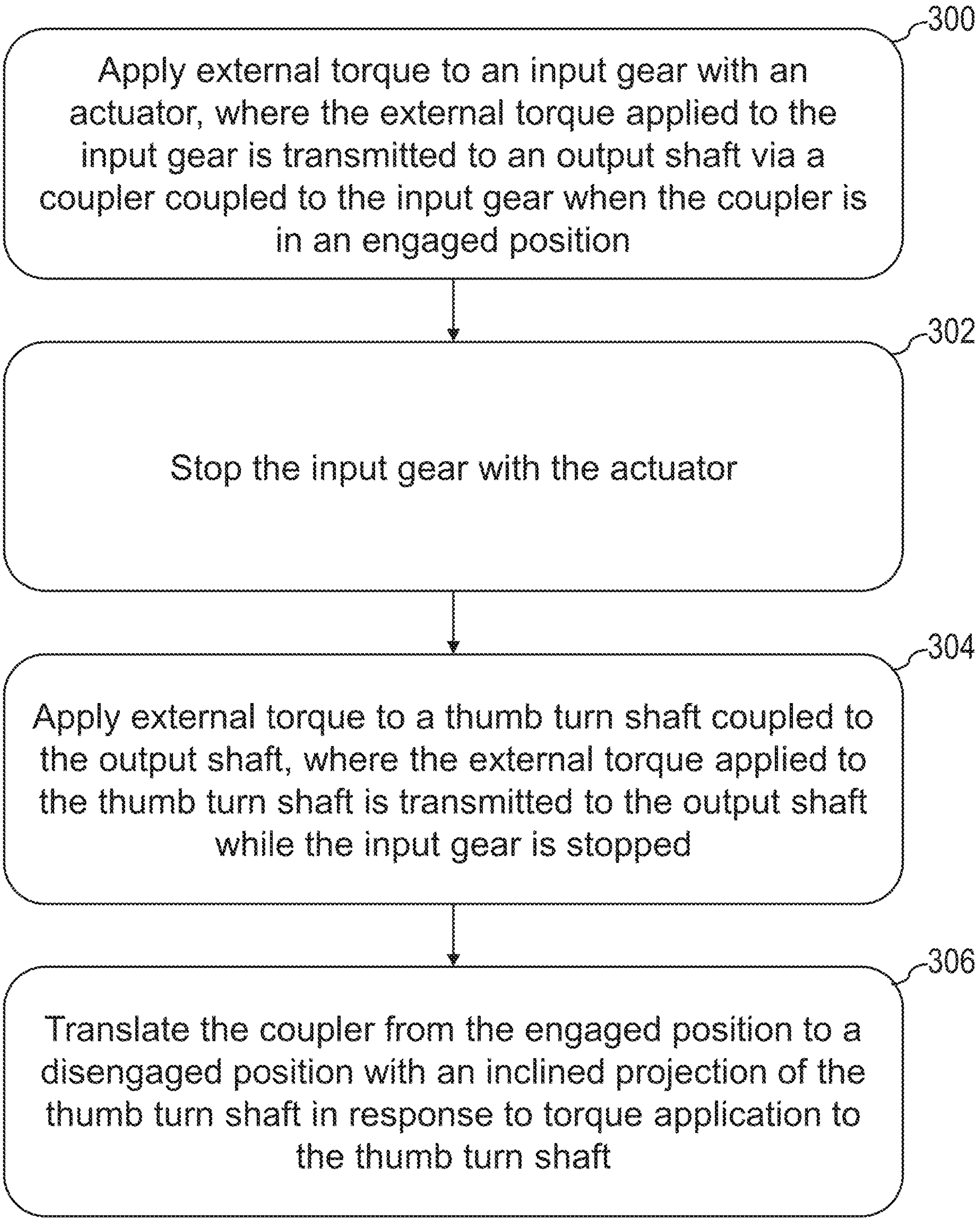
FIG. 9 is a flow chart for one embodiment of a method of operating a door lock.

FIG. 9 is a flow chart for one embodiment of a method of operating a door lock. In block 300, external torque is applied to an input gear with an actuator. The external torque may originate from a motor, in some embodiments, and may be magnified or reduced as appropriate by a gear train associated with the motor. The external torque applied by the actuator is transmitted to an output shaft via a coupler coupled to the input gear when the coupler is in an engaged position. In block 302, the input gear may be stopped with the actuator. In some embodiments, stopping the input gear with the actuator may include cutting power to the actuator. In such embodiments, the input gear may be stopped by friction. In other embodiments, stopping the input gear may include applying an active force with the actuator to stop the input gear. In some other embodiments, stopping the input gear may include applying a braking force to the input gear or a coupled component (e.g., with a brake). In block 304, external torque may be applied to a thumb turn shaft (e.g., by a user at a handle) coupled to the output shaft while the input gear is stopped. The torque applied to the thumb turn shaft may be transferred to the output shaft such that the thumb turn shaft and output shaft rotate together relative to the coupler. The coupler may be held stationary by the stopped input gear such that the rotation of the coupler is also stopped. In block 306, the coupler is translated from the engaged position to a disengaged position with an inclined projection of the thumb turn shaft in response to torque application to the thumb turn shaft. In some embodiments, an inclined wall of the projection of the thumb turn shaft may cam the coupler to the disengaged position. In some embodiments, the couple may re-seat with the thumb turn shaft in regular intervals as the thumb turn shaft rotates relative to the coupler. For example, every 90-degree rotation the coupler may return to the engaged position as the inclined projection of the thumb turn shaft aligns with a receptacle of the coupler. Other angular intervals are contemplated, including 45 degrees, 60 degrees, 120 degrees, and 180 degrees, as the present disclosure is not so limited. Each time the coupler re-seats with the thumb turn shaft, the thumb turn shaft may again cam the coupler to the disengaged position to continue rotating. In this manner, the coupler may generate "clicks" as a user rotates the thumb turn shaft.

Figure 10:
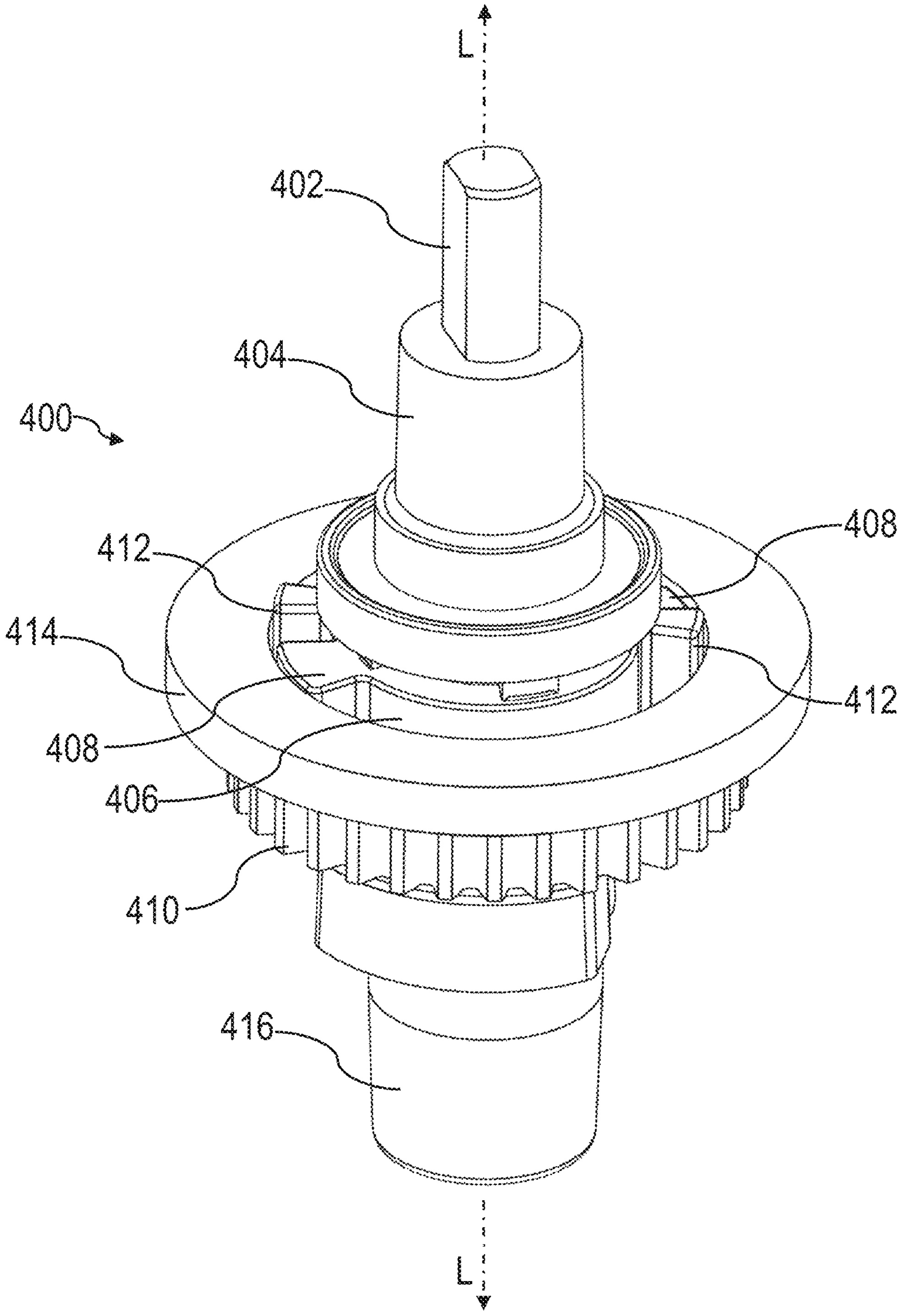
FIG. 10 is a perspective view of another embodiment of a clutch for a door lock.

FIG. 10 is a perspective view of another embodiment of a clutch 400 for a door lock. As shown in FIG. 10, the clutch includes an output shaft 402, a collar 404, a clutch disk 406, an input gear 410, and an output coupler 416. The output shaft 402 extends through the clutch 400 and includes flats configured to rotationally couple some components of the clutch together to allow torque transmission therebetween. In the embodiment of FIG. 10, the collar 404 and the output coupler 416 are coupled to the output shaft 402 such that the output shaft 402, collar 404, and output coupler 416 rotate together and transmit torque between one another. The clutch disk 406 and the input gear 410 are not directly coupled to the output shaft 402. The clutch disk 406 is selectively couplable to the output shaft 402 to allow torque transmission between the input gear 410 and the output shaft 402. The input gear 410 may be coupled to an actuator assembly, similar to the actuator assembly shown and described with reference to FIGS. 1-2. The input gear may receive external torque from an actuator of the actuator assembly and may transfer that torque through the clutch disk to the output shaft 402 to rotate the output shaft 402. Rotation of the output shaft 402 may operate the door lock. For example, rotation of the output shaft 402 about a longitudinal axis L of the output shaft 402 in a first direction may extend a bolt or latch of the door lock, and rotation of the output shaft 402 in a second direction opposite the first direction may retract the bolt or latch of the door lock.

According to the embodiment of FIG. 10, the clutch disk 406 is configured to control the transmission of torque between the output shaft 402 and the input gear 410. The clutch disk 406 is configured to move between an engaged position and a disengaged position. In the engaged position, the clutch disk 406 is configured to engage the output shaft 402 such that the clutch disk 406 and the output shaft 402 are coupled. In the engaged position, the input gear 410 may be driven to rotate the output shaft 402 through the clutch disk 406. In the disengaged position, the clutch disk 406 is configured to decouple from the output shaft 402 such that the output shaft 402 is able to rotate relative to the clutch disk 406 and input gear 410 without interference of the input gear 410 or associated actuator assembly. In the embodiment of FIG. 10 and as will be discussed further below, the clutch disk 406 is configured to be in the disengaged position by default. A spring (see FIG. 11) biases the clutch disk 406 to the disengaged position. When torque is applied to the input gear 410, the clutch disk 406 may be moved automatically to the engaged position, as will be discussed with reference to FIGS. 12-14. In particular, relative rotation of the input gear 410 and the clutch disk 406 may cause the clutch disk 406 to move from the disengaged position to the engaged position. Once the clutch disk is in the engaged position, wings 408 of the clutch disk 406 may be engaged by pins 412 of the input gear 410 such that the input gear 410 drives the clutch disk 406. As shown in FIG. 10, the clutch 400 includes an anti-rotation ferromagnetic ring 414 disposed around the clutch disk 406 while the clutch disk 406 is in the disengaged position. The anti-rotation ferromagnetic ring 414 may be configured to resist rotation of the clutch disk 406 while the clutch disk is in the disengaged position so that the input gear 410 may rotate relative to the clutch disk 406.

Figure 11:
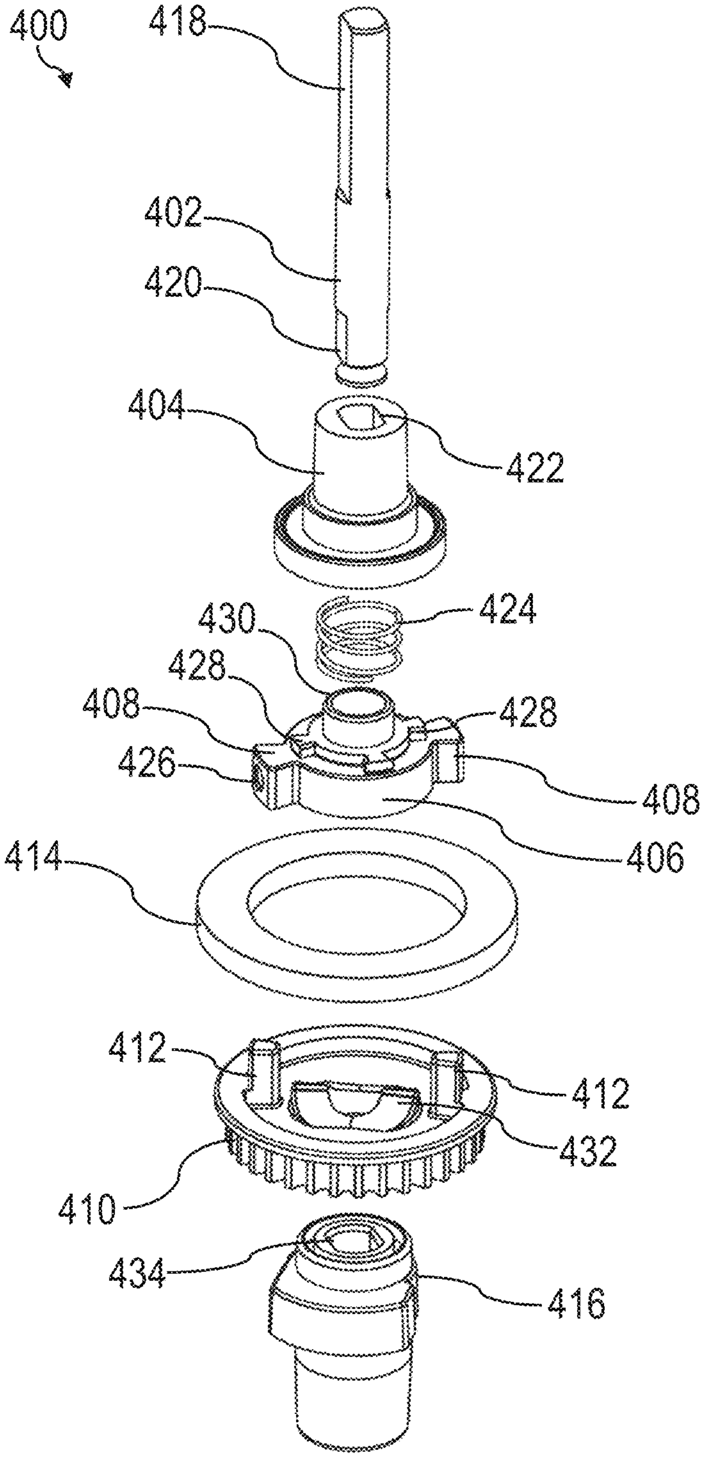
FIG. 11 is an exploded view of the clutch of FIG. 10.

FIG. 11 is an exploded view of the clutch 400 of FIG. 10 showing additional details of the components of the clutch 400. As shown in FIG. 11, the output shaft 402 includes a first flat 418 and a second flat 420. The first flat 418 is configured to engage the collar 404. In particular, a channel 422 receives the first flat 418 to attach the collar 404 to the output shaft 402, thereby coupling the collar 404 to the output shaft 402 and ensuring the collar 404 rotates commensurately with output shaft 402. The second flat 420 is configured to engage the output coupler 416. In particular, the second flat 420 is received in a channel 434 of the output coupler 416. Accordingly, the output coupler 416 rotates commensurately with the output shaft 402 and the collar 404.

As shown in FIG. 11, the clutch 400 includes a spring 424. In the embodiment of FIG. 11, the spring 424 is configured as a compression spring and is disposed between the collar 404 and the clutch disk 406. The spring 424 applies a biasing force urging the clutch disk toward the input gear 410. Accordingly, the spring 424 holds the clutch disk 406 in engagement with the input gear 410. The spring 424 may hold the clutch disk 406 in engagement with the input gear 410 in both the engaged position and the disengaged position. The spring may be supported on the clutch disk 406 by a spring support 430. The spring support 430 may also provide a rotational bearing surface against the collar 404, allowing the clutch disk to rotate about the longitudinal axis of the output shaft 402.

The clutch disk 406 of the clutch 400 includes a clutch disk projection 428. The clutch disk projection 428 is configured as a socket head that may be received in a corresponding socket of the collar 404 (for example, see FIG. 12). When the clutch disk projection 428 engages the collar 404 the clutch disk 406 and the collar 404 may be coupled such that torque may be transmitted between the clutch disk 406 and the collar 404. The clutch disk 406 also includes two wings 408. The wings 408 are configured to engage corresponding pins 412 formed as a part of the input gear 410. The wings 408 may contact the pins 412 to allow torque transmission between the clutch disk 406 and input gear 410. According to the embodiment of FIG. 11, the input gear 410 and the clutch disk 406 may have a substantial amount of backlash, which allows for relative rotation between the clutch disk 406 and the input gear 410. In some embodiments as shown in FIG. 11, the backlash may be approximately 180 degrees. In other embodiments, any number of wings 408 and pins 412 may be employed with a corresponding degree of backlash, as the present disclosure is not so limited.

As shown in FIG. 11, the clutch 400 includes an anti-rotation ferromagnetic ring 414. In some embodiments, the ferromagnetic ring 414 may be formed of steel, though in other embodiments any suitable ferromagnetic material may be employed. The clutch disk 406 includes at least one magnet (e.g., two magnets 426) disposed in the wings 408 of the clutch disk 406. The magnets 426 are disposed on opposing sides of the clutch disk 406 relative to a longitudinal axis of the output shaft 402. The magnets 426 may be attracted to the ferromagnetic ring 414. The attractive force of the magnets 426 to the ring 414 may bias the clutch disk 406 to a particular rotational position. The magnets 426 may resist rotation of the clutch disk 406 while the clutch disk is in the disengaged position. In the disengaged position, the magnets 426 and the ferromagnetic ring 414 may be aligned on the same plane. In the engaged position, the magnets 426 and ferromagnetic ring 414 may not be aligned on the same plane, such that the magnets 426 do not substantially resist rotation of the clutch disk 406 while the clutch disk is in the engaged position.

In the embodiment of FIG. 11, the input gear 410 includes an inclined wedge 432. The inclined wedge is configured to engage the clutch disk 406 to move the clutch disk 406 from the disengaged position to the engaged position. In particular, rotation of the input gear 410 relative to the clutch disk 406 causes the inclined wedge 432 to engage the clutch disk 406 and cam the clutch disk 406 to the engaged position against the biasing force from the spring 424. The movement of the clutch disk 406 and the portion of the clutch disk 406 engaged by the input gear 410 is discussed further below with reference to FIGS. 12-14.

It should be noted that while the collar 404 and the output shaft 402 are formed as separate components in the embodiment of FIG. 11, in other embodiments the collar 404 and the output shaft 402 may be integrally formed with one another as a single piece, as the present disclosure is not so limited. Likewise, while the output coupler 416 and output shaft 402 are formed as separate components in the embodiment of FIG. 11, in other embodiments the output coupler 416 and the output shaft 402 may be integrally formed with one another as a single piece, as the present disclosure is not so limited.

Figure 12:
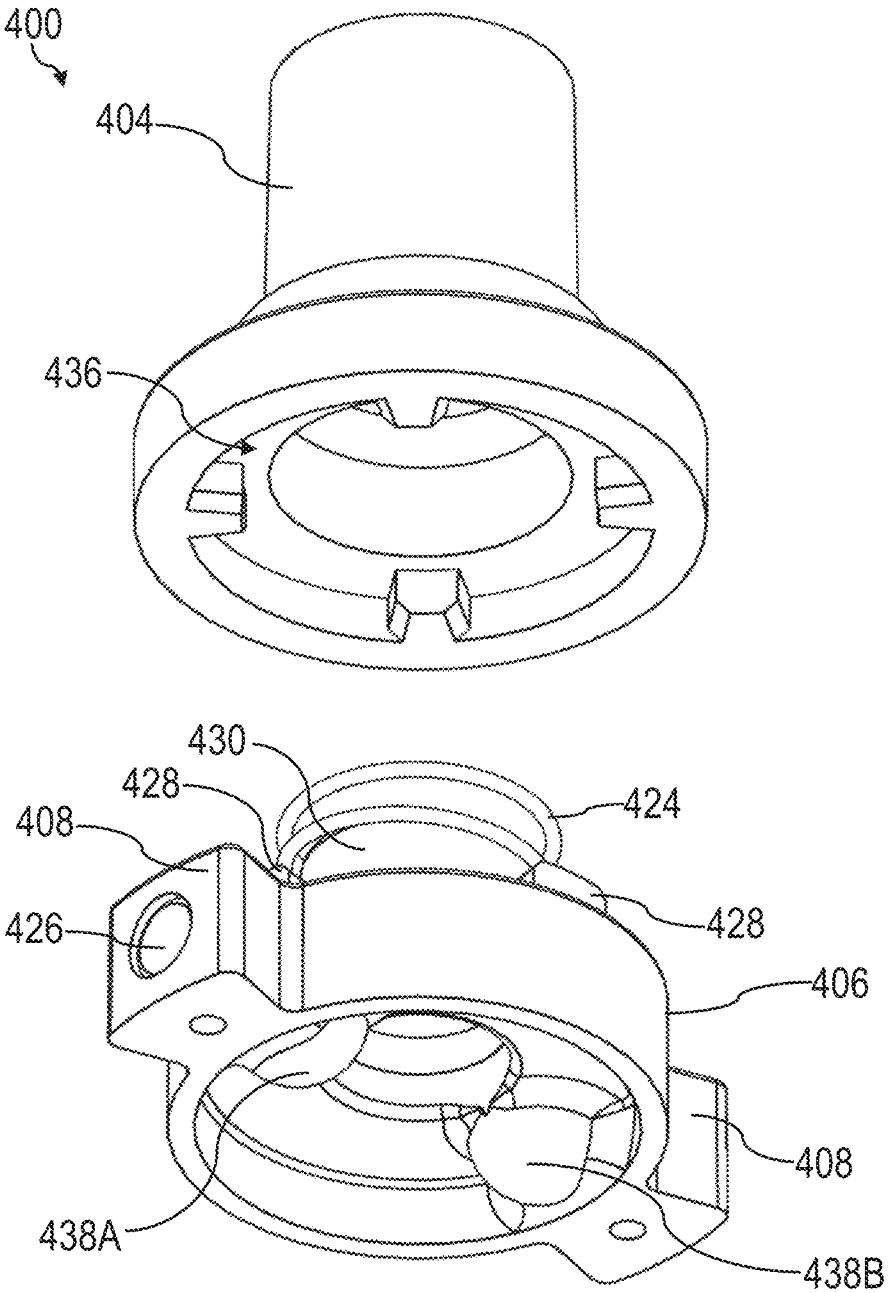
FIG. 12 is an exploded perspective view of a portion of the clutch of FIG. 10.

FIG. 12 is an exploded bottom perspective view of a portion of the clutch 400 of FIG. 10. In particular, FIG. 12 illustrates a bottom view of the collar 404 and the clutch disk 406. The collar 404 includes a socket 436 that faces the clutch disk 406. The socket 436 is configured to receive the socket head projection 428 of the clutch disk shown in FIG. 11. When the socket head projection 428 is received in the socket 436, torque may be transmitted between the collar 404 and the clutch disk 406 and the collar 404 and clutch disk 406 may rotate together. As the clutch disk 406 moves toward the collar 404 into the engaged position, the socket head projection 428 is received in the socket 436.

As shown in FIG. 12, the clutch disk 406 includes a first ball 438A (e.g., at least one ball) and a second ball 438B. The first ball 438A and the second ball 438B are aligned with the wings 408 of the clutch disk. The first ball 438A is disposed on a first side of the clutch disk 406 (relative to a longitudinal axis of an associated output shaft) and the second ball 438B is disposed on a second side of the clutch disk 406 opposing the first side. The first ball 438A and the second ball 438B provide camming surface that engage the inclined wedge of the input gear (see FIG. 11). In particular, relative rotation of the clutch disk 406 and the input gear causes the first ball 438A and the second ball 438B to ride up on the inclined wedge, translating the clutch disk 406 along the associated output shaft. The relative rotation of the clutch disk 406 and the input gear may be provided by the attraction between the magnets 426 of the clutch disk 406 and a ferromagnetic ring (see FIG. 11). As the clutch disk 406 and the input gear 410 continue to rotate relative to one another, the clutch disk 406 translates to the engaged position where the clutch disk 406 engages the socket 436 of the collar. Once the wings 408 of the clutch disk 406 engage the pins (see FIG. 11) the clutch disk may cease to rotate relative to the input gear and may instead rotate with the input gear. Accordingly, continued rotation of the input gear may be transmitted through the clutch disk in the engaged position to the output shaft via the collar 404. Once the input gear stops rotating, the spring 424 biases the clutch disk to return to the disengaged position, thereby removing the socket head projection 428 from the socket 436 and decoupling the input gear from the output shaft. In some embodiments, the force from the spring 424 may cause the first ball 438A and the second ball 438B to move down the inclined wedge of the input gear, thereby rotating the wings 408 out of engagement with the pins of the input gear.

Figure 13:
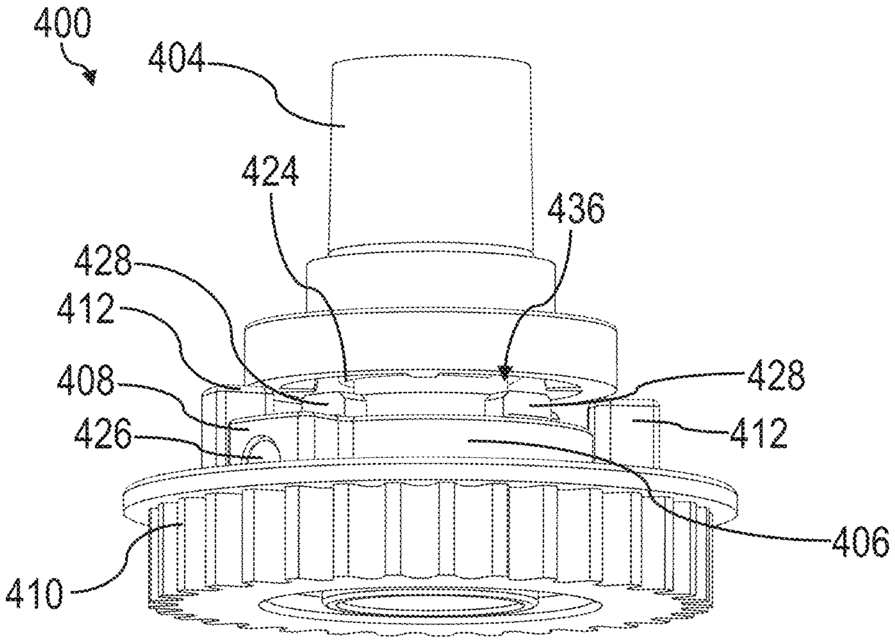
FIG. 13 is a side perspective view of the portion of FIG. 12 in a first state.
Figure 14:
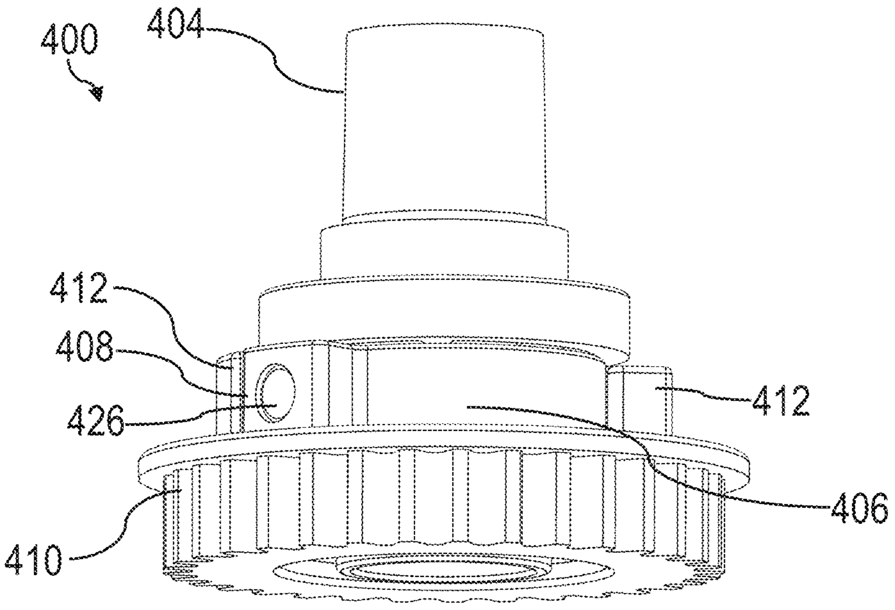
FIG. 14 is a side perspective view of the portion of FIG. 12 in a second state.

FIG. 13 is a side perspective view of the clutch 400 of FIG. 12 in a first state, and FIG. 14 shows the clutch 400 in a second state. The two states of FIGS. 13-14 correspond to the disengaged position and the engaged position of the clutch disk 406. As shown in FIG. 13, the clutch disk 406 is in the default disengaged position. The clutch disk is biased to the disengaged position with the spring 424. In the disengaged position, the socket head projection 428 clears the socket 436. Accordingly, the clutch disk 406 is decoupled from the collar 404, and therefore the input gear 410 is decoupled from the collar 404. In FIG. 14, the clutch disk 406 is in the engaged position. Between the states shown in FIG. 13 and FIG. 14, the input gear 410 may rotate relative to the clutch disk 406 to lift the clutch disk 406 toward the collar 404. For example, an inclined wedge of the input gear 410 may translate the clutch disk 406 to the engaged position. In the engaged position, the clutch disk 406 is in contact with the collar 404. In particular, the socket head projection 428 is received in the socket 436.

Figure 15:
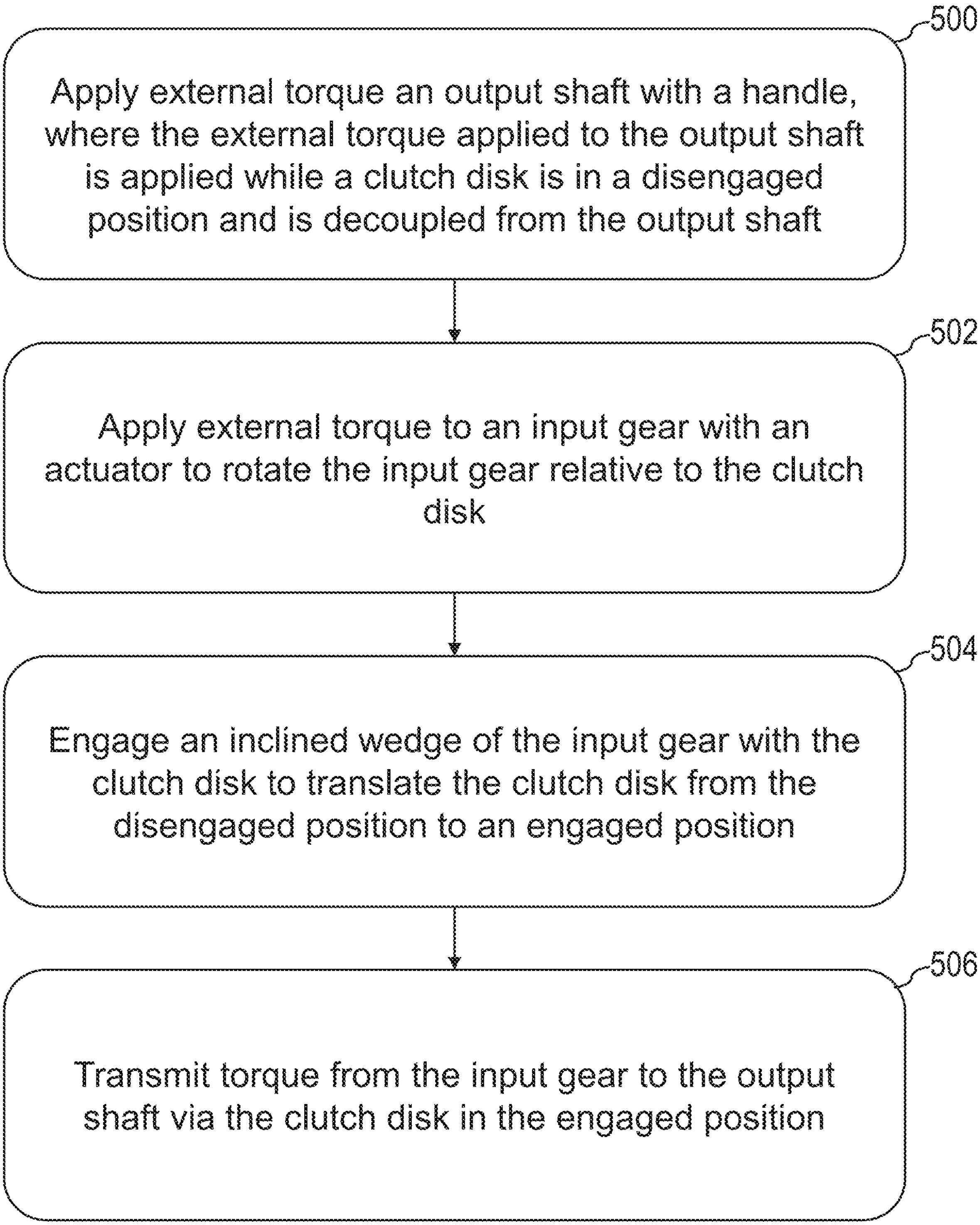
FIG. 15 is a flow chart for another embodiment of a method of operating a door lock.

FIG. 15 is a flow chart for another embodiment of a method of operating a door lock. In block 500, external torque is applied to an output shaft with a handle. For example, the external torque may be applied by a user at a thumb turn. In some embodiments, the handle may be directly coupled to the output shaft. In other embodiments, the torque may be transmitted through a thumb turn shaft. In block 502, external torque is applied to an input gear with an actuator to rotate the input gear relative to the clutch disk. In some embodiments, the clutch disk may be held stationary by magnetic attraction between at least one magnet disposed on the clutch disk and a ferromagnetic ring surrounding the clutch disk. In other embodiments, a frictional bearing may be employed to apply static and/or dynamic friction to the clutch disk such that the input gear is able to rotate relative to the clutch disk. In block 504, an inclined wedge of the input gear is engaged with the clutch disk to translate the clutch disk from the disengaged position to the engaged position. For example, in some embodiments, the inclined wedge may engage at least one ball disposed on a lower surface of the clutch disk to cam the at least one ball and translate the clutch disk from the disengaged position to the engaged position. The movement of the clutch disk may be against a biasing force of a spring urging the clutch disk toward the disengaged position. In block 506, torque may be transmitted from the input gear to the output shaft via the clutch disk while the clutch disk is in the engaged position. Following block 506, in some embodiments the method may include translating the clutch disk from the engaged position to the disengaged position with a spring once the external torque is no longer applied to the input gear.

Various aspects of the present disclosure may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the embodiments described herein may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Further, some actions are described as taken by a "user." It should be appreciated that a "user" need not be a single individual, and that in some embodiments, actions attributable to a "user" may be performed by a team of individuals and/or an individual in combination with computer-assisted tools or other mechanisms.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. Accordingly, the foregoing description and drawings are by way of example only.

What is claimed is:

1. A clutch for a door lock, the clutch comprising:

an output shaft configured to operate the door lock, wherein the output shaft rotates about a longitudinal axis;

a thumb turn shaft coupled to the output shaft, wherein the thumb turn shaft comprises an inclined projection;

an input gear operatively couplable to the output shaft, the input gear configured to be coupled to an actuator output; and a coupler coupled to the input gear such that the coupler and the input gear rotate together about the longitudinal axis, wherein the coupler is configured to translate along the longitudinal axis between an engaged position and a disengaged position, wherein in the engaged position the coupler is coupled to the output shaft, wherein in the disengaged position the coupler is decoupled from the output shaft, and wherein the inclined projection of the thumb turn shaft is configured to move the coupler from the engaged position to the disengaged position when the thumb turn shaft rotates relative to the coupler.

2. The clutch of claim 1, further comprising a spring configured to bias the coupler toward the engaged position.

3. The clutch of claim 2, wherein the spring is a compression spring disposed between the input gear and the coupler, and wherein the spring is configured to bias the coupler into engagement with the thumb turn shaft.

4. The clutch of claim 2, wherein the coupler is configured to be in contact with the thumb turn shaft in both the engaged position and the disengaged position.

5. The clutch of claim 1, wherein the coupler comprises a receptacle configured to receive the inclined projection, wherein in the engaged position the inclined projection is received in the receptacle, and wherein in the disengaged position the inclined projection clears the receptacle.

6. The clutch of claim 5, wherein the receptacle and the inclined projection have commensurate shapes.

7. The clutch of claim 6, wherein the receptacle and the inclined projection are triangular, wherein the receptacle comprises a first inclined receptacle wall and a second inclined receptacle wall, wherein the inclined projection comprises a first inclined projection wall and a second inclined projection wall, wherein the first inclined projection wall is configured to engage the first inclined receptacle wall to move the coupler to the disengaged position when the thumb turn shaft rotates in a first direction relative to the coupler, and wherein the second inclined projection wall is configured to engage the second inclined receptacle wall to move the coupler to the disengaged position when the thumb turn shaft rotates in a second direction relative to the coupler.

8. The clutch of claim 5, wherein the receptacle is a first receptacle of a plurality of receptacles, and wherein the inclined projection is a first inclined projection of a plurality of inclined projections.

9. The clutch of claim 8, wherein the plurality of receptacles is equally spaced about the longitudinal axis, and wherein the plurality of inclined projections is equally spaced about the longitudinal axis.

10. The clutch of claim 1, further comprising a worm gear engaged with the input gear, wherein the worm gear is configured to resist rotation of the input gear when external torque is applied to the thumb turn shaft such that the thumb turn shaft rotates relative to the coupler.

11. A clutch for a door lock, the clutch comprising:

an output shaft configured to operate the door lock, wherein the output shaft rotates about a longitudinal axis;

an input gear configured to be coupled to an actuator output, wherein the input gear comprises an inclined wedge; and a clutch disk configured to translate along the longitudinal axis between an engaged position and a disengaged position, wherein in the engaged position the clutch disk is engaged with the output shaft such that the clutch disk transmits torque between the input gear and the output shaft, wherein in the disengaged position the clutch disk is decoupled from the output shaft such that the input gear is decoupled from the output shaft, and wherein the inclined wedge of the input gear is configured to engage the clutch disk to move the clutch disk from the disengaged position to the engaged position when the input gear rotates relative to the clutch disk.

12. The clutch of claim 11, further comprising a collar attached to the output shaft, wherein the collar comprises a socket, wherein the clutch disk comprises a projection, and wherein in the engaged position the projection is received in the socket.

13. The clutch of claim 11, wherein the input gear further comprises a first pin and a second pin, wherein the clutch disk comprises a first wing and a second wing, and wherein the first wing and the second wing are configured to engage the first pin and the second pin, respectively, to allow torque transmission between the clutch disk and the input gear.

14. The clutch of claim 11, further comprising a ferromagnetic ring disposed around the clutch disk, wherein the clutch disk comprises at least one magnet attracted to the ferromagnetic ring, and wherein attraction between the at least one magnet and the ferromagnetic ring is configured to resist rotation of the clutch disk relative to the ferromagnetic ring.

15. The clutch of claim 14, wherein in the disengaged position the at least one magnet is aligned with the ferromagnetic ring, and wherein in the engaged position the at least one magnet is not aligned with the ferromagnetic ring.

16. The clutch of claim 14, wherein the at least one magnet is two magnets, and wherein the two magnets are disposed on opposing sides of the clutch disk relative to the longitudinal axis.

17. The clutch of claim 11, further comprising a spring configured to bias the clutch disk toward the disengaged position.

18. The clutch of claim 17, further comprising a collar attached to the output shaft, wherein the spring is a compression spring disposed between a portion of the collar and the clutch disk, and wherein the spring is configured to bias the clutch disk into engagement with the input gear.

19. The clutch of claim 11, wherein the clutch disk comprises at least one ball configured to engage the inclined wedge to move the clutch disk from the disengaged position to the engaged position when the input gear rotates relative to the clutch disk.

20. The clutch of claim 19, wherein the at least one ball is two balls, and wherein the two balls are disposed on opposing sides of the clutch disk relative to the longitudinal axis.

* * * * *